(12) United States Patent
Lane

(10) Patent No.: US 7,810,781 B2
(45) Date of Patent: Oct. 12, 2010

(54) IMAGING DEVICE MOUNTING APPARATUS

(75) Inventor: Jeffrey Lane, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 458 days.

(21) Appl. No.: 11/818,678

(22) Filed: Jun. 15, 2007

(65) Prior Publication Data

US 2008/0308706 A1 Dec. 18, 2008

(51) Int. Cl.
*F16M 13/00* (2006.01)
(52) U.S. Cl. .................. 248/615; 248/317; 248/323; 248/560; 248/634
(58) Field of Classification Search .................. 248/560, 248/613, 634, 635, 632, 633, 615, 610
See application file for complete search history.

(56) References Cited

U.S. PATENT DOCUMENTS

| 5,390,892 A | * | 2/1995 | Platus | 248/619 |
| 5,627,616 A | | 5/1997 | Sergeant | |
| 6,676,101 B2 | * | 1/2004 | Platus | 248/603 |
| 6,886,799 B2 | * | 5/2005 | Yamanashi | 248/610 |
| 7,170,560 B2 | | 1/2007 | Tatewaki | |
| 2002/0029610 A1 | | 3/2002 | Chrystall | |
| 2003/0098399 A1 | * | 5/2003 | Rodriguez | 248/176.1 |
| 2005/0265711 A1 | | 12/2005 | Heibel | |
| 2006/0254190 A1 | | 11/2006 | Hunt | |

* cited by examiner

*Primary Examiner*—Amy J Sterling

(57) ABSTRACT

An imaging device mounting apparatus providing three-point stabilization is described.

9 Claims, 1 Drawing Sheet

IMAGING DEVICE MOUNTING APPARATUS

BACKGROUND

Imaging devices, such as cameras, may be mounted on a support surface such as a ceiling. Vibration of the support surface, such as caused by heating or cooling systems, may result in blurring of an image captured by the imaging device. It may be desirable to reduce the effect of support surface vibration on the imaging device.

DETAILED DESCRIPTION OF THE DRAWINGS

Imaging devices such as cameras may be mounted on a support surface such as a ceiling or a wall, or on a retractable arm that may be mounted on a ceiling, a wall or a floor surface. Vibration of the support surface, such as caused by heating or cooling systems, persons walking on a floor above the support surface, or large vehicles outside a building containing the support surface, may result in blurring of an image captured by the camera. One example embodiment of the present invention discloses a mounting apparatus that forces the camera into a three-point stabilized position with the use of three deformable bumpers that act as shock absorbers to insulate the camera from support surface vibrations.

For purposes of the present disclosure "three-point stabilization" is defined as three points of contact with a camera or the camera's base plate, wherein the three points of contact define a plane such that the camera is secured in the plane defined by the three points of contact.

Figure 1:
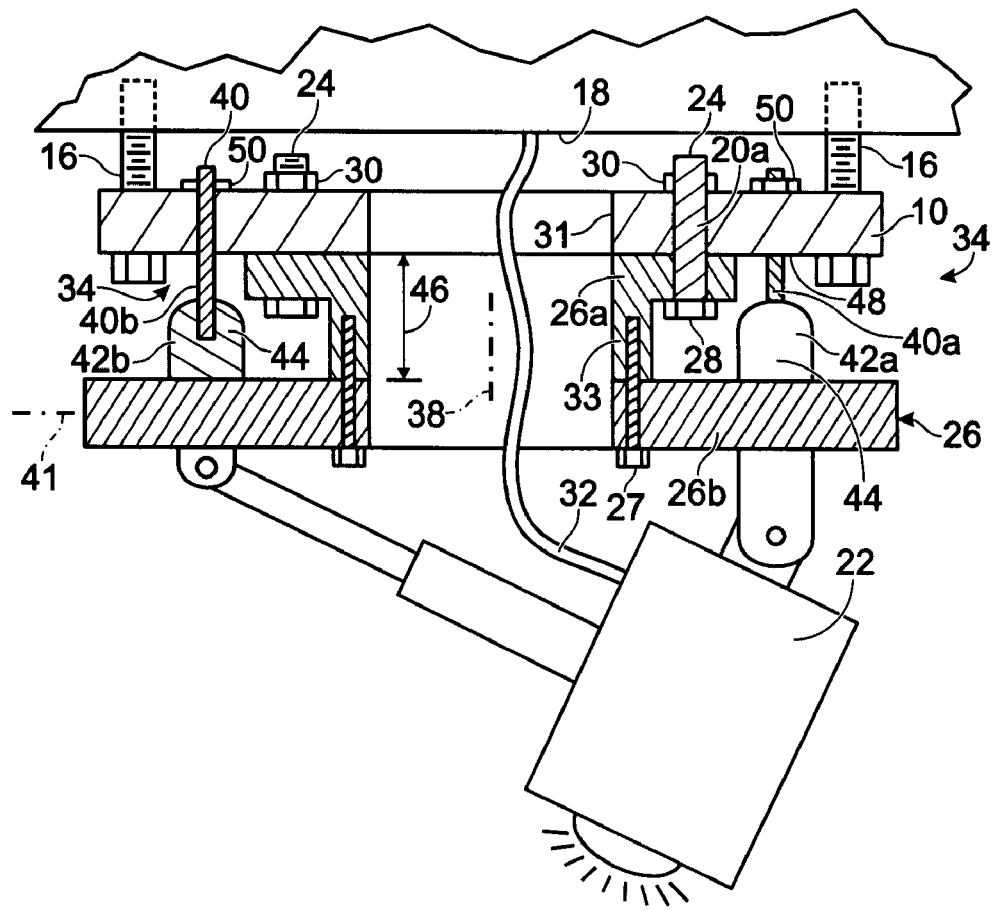
FIG. 1 is a cross-sectional view of one example embodiment of an imaging device mounted on one example embodiment of an imaging device mounting apparatus.
Figure 2:
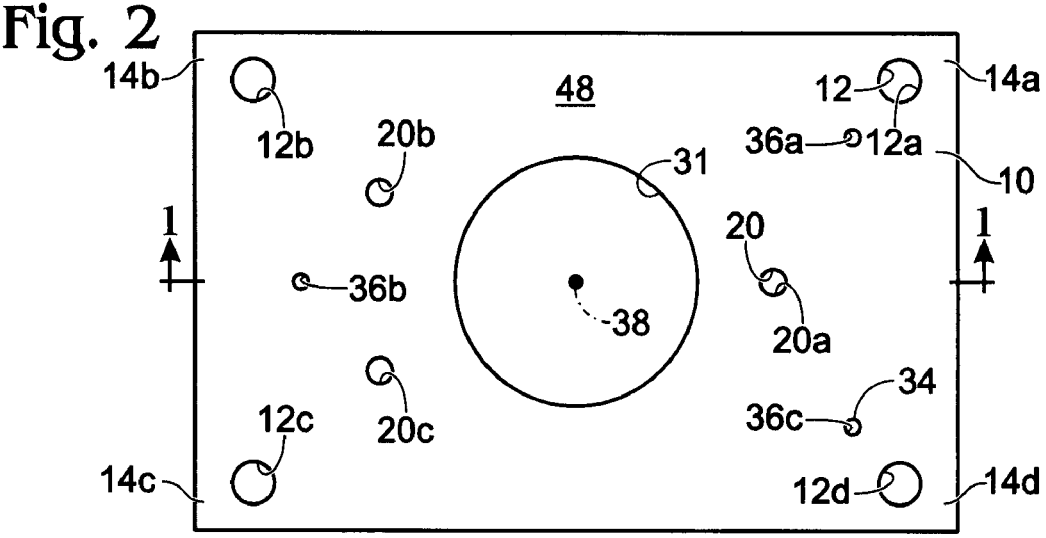
FIG. 2 is a schematic view of one example embodiment of an imaging device mounting apparatus.

FIGS. 1 and 2 are a cross-sectional side view of one example embodiment of an imaging device 22 mounted on a mounting apparatus, such as a mounting plate 10, and a plan view of the mounting plate 10, respectively. Plate 10 may be manufactured of a durable, rigid material, such as steel, and may comprise a generally planar member having a plurality of apertures formed therein. A first set of apertures 12 may include four apertures 12a, 12b, 12c and 12d each positioned generally in a corner region 14a, 14b, 14c and 14d, respectively, of plate 10. Apertures 12 may be sized and/or threaded to allow a fastener 16, such as a threaded bolt, to be positioned therethrough so as to secure plate 10 to a support surface, such as a ceiling 18. In another embodiment, support surface 18 may be a support surface of a movable arm.

A second set of apertures 20 may include three apertures 20a, 20b and 20c that may be utilized to secure an imaging device, such as camera 22 to plate 10. Camera 22 may be any type of imaging device, such as a still camera that captures images with negatives or digital imaging, a video camera, an x-ray camera, or the like. In one example embodiment camera 22 is a document camera that is used to capture high resolution images of documents positioned below camera 22. Each of apertures 20a, 20b and 20c may be sized and/or threaded to allow a fastener, such as a threaded bolt 24, to be positioned therethrough so as to secure a camera base plate 26, which supports camera 22, to mounting plate 10. Second set of apertures 20 may be positioned within plate 10 such that the apertures 20 are each aligned with pre-drilled holes 28 in camera base plate 26 such that base plate 26 is easily secured to mounting plate 10. Lock nuts 30 may be used to secure fasteners 24 in place.

Second set of apertures 20 may be positioned adjacent to a central aperture 31 within plate 10 wherein central aperture 31 may be sized and positioned to allow imaging device cables 32 to extend therethrough. Base plate 26 may include a raised collar 33 region that spaces camera 22 from mounting plate 10 and which allows the passage of device cable 32 therethrough. In the example embodiment shown, imaging device cable 32 extends from ceiling 18, through aperture 31 of plate 10, through raised collar 33 of base plate 26 and to camera 22.

Mounting plate 10 may further include stabilizing structure 34, which in the example embodiment shown, may include three apertures 36a, 36b and 36c, spaced outwardly from a central axis 38 of plate 10 with respect to second set of apertures 20. In other words, second set of apertures 20 may be positioned closer to central axis 38 than apertures 36a, 36b and 36d. In this manner, stabilizing structure 34 may provide more stabilization forces than fasteners 24 positioned within each of second set of apertures 20.

Each of apertures 36a, 36b and 36c may be sized and/or threaded to allow a fastener, such as an all-thread fastener 40, to be positioned therethrough. The position of all-thread fasteners 40a, 40b and 40c within each of apertures 36a, 36b and 36c, respectively, may be adjusted so that each of fasteners 40 contacts camera base plate 26 and forces the base plate 26 away from mounting plate 10. When each of fasteners 40a, 40b and 40c contact base plate 26 and push against the base plate 26, the base plate 26 is forced into a three-point stabilized position meaning that base plate 26 is secured in the plane 41 (shown in dash dot lines of FIG. 1) defined by the end regions 42a, 42b and 42c, respectively, of each of fasteners 40a, 40b and 40c. Due to the spacing of fasteners 40a, 40b and 40c outwardly of fasteners 24 with respect to central axis 38, stabilizing structure 34 may provide a more stable positioning system than second set of apertures 20 with fasteners 24 secured therein.

Stabilizing structure 34 may further include shock absorber devices, such as deformable and/or flexible caps 44 positioned on the end regions 42a, 42b and 42c of each of fasteners 40a, 40b and 40c, respectively. Caps 44 may be manufactured of rubber, silicone, neoprene, foam, or the like. The caps 44 may act to reduce or eliminate support surface vibrations that may be transmitted to camera 22 from ceiling 18. In the example embodiment shown, caps 44 are positioned on each of end regions 42a, 42b and 42c such that as the all-thread fasteners 40a, 40b and 40c are adjusted within apertures 36a, 36b and 36c, i.e., as the height 46 of fasteners 40a, 40b and 40c extending above a top surface 48 of mounting plate 10 is adjusted, caps 44 contact camera base plate 26 and force the base plate 26 into a three-point stabilized positioned against shock absorbing caps 44. Fasteners 40 may be secured in place with lock nuts 50. Thereafter, vibration of a support surface, such as a ceiling 18, may be dampened or removed by caps 44 such that the vibration is not transmitted to camera base plate 26 or to camera 22. In this manner, camera 22 may be utilized to record images having a substantial absence of the blurring and imaging problems associated with camera vibrations, even in embodiments of high resolution document cameras 22.

Camera base 26 may include first and second sections 26a and 26b that may be secured together by fasteners 27. In prior art securement methods wherein camera base plate 26 may be secured directly to a ceiling, the connection of first and second sections 26a and 26b with fasteners 27 may provide a point of instability, resulting in vibration or other undesirable movement of camera 22 during use. In contrast, in the mounting system as disclosed herein, due to the spacing of fasteners 40a, 40b and 40c outwardly of fasteners 27 with respect to central axis 38, stabilizing structure 34 may provide a more stable positioning system than direct securement to a ceiling of camera base plate 26 having fasteners 27 positioned therein.

One example method of making mounting plate 10 will now be described. A steel plate 10 may be provided. A central aperture 38 may then be formed within plate 10 such that aperture 38 extends completely through plate 10. A first set of apertures 12 may be formed in corner regions 14 of plate 10. Apertures 12 may be threaded so as to securely receive a threaded fastener 16 therein. A second set of apertures 20 may then be formed in plate 10 wherein the position of apertures 20 may be based on apertures positioned within a base plate 26 of a camera 22. Apertures 20 may be threaded so as to securely receive a threaded fastener 24 therein. A third set of apertures 36 may then be formed in plate 10 wherein third set of apertures 36 may define a stabilizing structure 34 of plate 10. Apertures 36 may be spaced outwardly of central axis 38 when compared to a position of second set of apertures 20. Apertures 36 may be threaded so as to securely receive a threaded fastener 40 therein. A fastener 40 may then be secured within each of apertures 36 wherein each fastener 40 may include a shock absorbing cap 44 on an end 42 thereof so as to dampen the effect of vibration on a camera 22 secured on mounting plate 10.

One example method of using a mounting plate 10 will now be described. An imaging device such as a camera 22 may be mounted on a mounting plate 10 such as by the use of fasteners 24 in apertures 20. A position of each of three stabilizing devices 40 with respect to the mounting plate 10 may be adjusted such that a deformable end bumper 44 of each stabilizing device 40 pushes against the camera 22 and forces the camera 22 into a three-point stabilized position on the mounting plate 10. The mounting plate 10 may then be secured to a mounting surface, such as a ceiling 18, by use of fasteners 16 secured to mounting plate 10.

Other variations and modifications of the concepts described herein may be utilized and fall within the scope of the claims below.

I claim:

1. An imaging device mounting apparatus, comprising:
a mounting plate including first mounting structure for mounting said mounting plate to a mounting surface, and second mounting structure for mounting an imaging device to said mounting plate; and
stabilizing structure, including three adjustable fasteners, each of said three adjustable fasteners located in a threaded aperture in the mounting plate and movably positionable with respect to said mounting plate, each of said three adjustable fasteners including a deformable cap adapted for contacting an imaging device mounted to said mounting plate and positioning said imaging device into a three-point stabilization position.

2. The apparatus of claim 1 wherein said mounting plate defines a central axis positioned perpendicular to said mounting plate, and wherein said second mounting structure is positioned a distance closer to said central axis than said stabilizing structure.

3. The apparatus of claim 1 wherein said three adjustable fasteners of said stabilizing structure includes three all-thread fasteners.

4. The apparatus of claim 1 wherein each of said deformable cap comprises a flexible bumper.

5. The apparatus of claim 1 wherein said first mounting structure comprises four threaded fasteners each positioned within an aperture of said mounting plate.

6. The apparatus of claim 1 wherein said second mounting structure comprises three threaded fasteners each positioned within an aperture of said mounting plate.

7. The apparatus of claim 1 wherein said mounting surface is chosen from one of the group including a ceiling surface, a wall surface, and a surface of a movable arm.

8. An imaging device mounting apparatus, comprising:
a mounting plate including first mounting structure for mounting said mounting plate to a mounting surface, and second mounting structure for mounting an imaging device to said mounting plate; and
stabilizing structure secured to said mounting plate and including three adjustable fasteners movably positionable with respect to said mounting plate, each of said three adjustable fasteners including a deformable cap adapted for contacting an imaging device mounted to said mounting plate and positioning said imaging device into a three-point stabilization position;
wherein said mounting plate further comprises a central aperture adapted to allow an imaging device cable to pass therethrough.

9. The apparatus of claim 1 wherein said deformable caps are manufactured of one of rubber, silicone, neoprene, and foam.

* * * * *